United States Patent Office 3,227,723
Patented Jan. 4, 1966

3,227,723
PROCESS FOR PREPARING BIPYRIDYLS
Albert Baines and Alastair Campbell, Widnes, England, assignors to Imperial Chemical Industries Limited, London, England, a corporation of Great Britain
No Drawing. Filed May 14, 1962, Ser. No. 194,723
Claims priority, application Great Britain, May 26, 1961, 19,081/61
12 Claims. (Cl. 260—296)

This invention relates to an organic chemical process for the manufacture of bipyridyls, more particularly for the manufacture of 4:4'-bipyridyl.

It is known that bipyridyls, including particularly 4:4'-bipyridyl, can be prepared by oxidation of the product formed by the interaction of sodium and pyridine. Manufacture of bipyridyls in this way is complicated by the difficulty encountered in making the interaction of sodium and pyridine proceed in a rapid but controllable manner, and by the risk of explosion on the oxidation stage consequent on the presence of unreacted sodium. It has been proposed to carry out the sodium-pyridine interaction in the cold, to use a very large excess of pyridine, or to heat the pyridine-sodium interaction product for long periods in order to achieve satisfactory regulation of the reaction or to improve the yields of bipyridyls. These proposals are not economically attractive or convenient, however, and the yields of bipyridyls so obtained are not high.

The prior art processes also have the disadvantage that the small yield of bipyridyl isomers thereby produced contain considerable amounts of the 2:2'- and 2:4'-isomers in addition to the 4:4'-isomer. The 4:4'-isomer is a particularly valuable intermediate for the manufacture of herbicidal materials, and any formation of the other isomers consequently represents a loss of expensive starting materials. It is therefore of importance that the yield of bipyridyls and the proportion of the 4:4'-isomer in the product should be increased as much as possible.

We have now found that the ratio of 4:4'-isomer to the other bipyridyl isomers obtained by the oxidation of the product formed by the interaction of sodium and pyridine varies with the conditions, particularly to temperature of the initial reaction between the sodium and the pyridine. We have also found that the separation of the products of the oxidation step (which is complicated by the formation of a dispersion of sodium hydroxide in a colloidal and unifilterable form) can be simplified by adding water to the oxidised reaction mixture, and heating for a short time.

According to the present invention, therefore, we provide a process for the manufacture of bipyridyls which comprises treating a pyridine with sodium at a temperature of at least 50° C. and oxidising the sodium-pyridine interaction product so formed.

The process is carried out in the liquid phase, and we find that especially in the case of pyridine itself the most suitable temperature for treatment of the pyridine with the sodium is in the range 50° C. to 120° C., and preferably in the range 75° C. to 100° C.

The examples illustrating the invention show clearly that the amount of the unwanted 2:4'- and 2:2'-isomers falls as the temperature of the reaction between sodium and pyridine is reduced from 115° C. to 80° C. At 115° C. the ratio of the amount of 4:4'-isomer to the amount of the other isomers in the final product is of the order of 1.6 to 1, and at 90° C. this ratio is of the order 14 to 1. It is important to note that if the temperature is reduced to below 50° C. the yield on both sodium and pyridine falls and an increased amount of undesirable by-products in produced.

It is clear therefore that it is of importance to control the temperature of the reaction between the sodium and the pyridine within a given range in order to obtain a high proportion of 4:4'-bipyridyl in the final product of the reaction. Control of temperature also affects the yield obtained on the reactants used. A high temperature, i.e. about the reflux temperature, gives a good yield on sodium, and temperatures in the range 50° to 80° C. give good yields on pyridine. Thus the choice of the temperature may be made to give a product which contains a high proportion of the 4:4'-isomer and represents an economic yield on the reactants used.

The ratio of isomers in the final product is also affected to a lesser extent by the time allowed for the reaction between the dispersed sodium and pyridine. This factor is not as critical as the control of temperature, but under certain conditions correlation of reaction time with temperature gives improved results. It is of importance that the reaction should be continued at least until all the metallic sodium initially present has reacted.

It is preferred that the sodium used should be in a dispersed form. Pieces of sodium may be used, particularly when the interaction of the sodium and the pyridine is carried out at temperatures above the melting point of sodium (approximately 98° C.), but the smoothness of reaction is greatly assisted by using as highly dispersed a form of sodium as is practicable. Suitable dispersed forms of sodium can be prepared by conventional means, for example by mechanical or ultrasonic means. The sodium may be dispersed in an inert liquid medium, which may be selected so as to have a boiling point which is convenient in the preparation of the dispersion or in subsequent operations. Suitable inert liquids include liquid (and readily melted) hydrocarbons, for example petroleum fractions and alkylated benzenes.

It is desirable to observe the usual precautions for the use of sodium, particularly the substantial exclusion of moisture during the reaction.

If desired, the interaction between the sodium and pyridine may be carried out in the presence of an inert diluent, which may include that used for the preparation of the sodium dispersion and may be for example trimethyl benzene.

The pyridine for use in the process of the present invention should be free from any substituent or impurity which can take part in an undesired side-reaction in the presence of sodium. If necessary the pyridine may be dried, for example by standing over or distilling from solid sodium hydroxide before use.

The process of our invention is especially applicable to pyridine itself, but can also be applied to pyridines containing hydrocarbon radicals (particular alkyl radicals, for example methyl and/or ethyl radicals) as substituents.

As stated above, the formation of the 4:4'-bipyridyl isomers is favoured by the process of the present invention. When 2-methylpyridine (alpha picoline) is the pyridine used the product is 2:2'-dimethyl-4:4'-bipyridyl, and when 2:6-dimethyl-pyridine (2:6-lutidine) is the pyridine used the product is 2:2':6:6'-tetramethyl-4:4'-bipyridyl. We believe these two particular compounds to be new.

The relative proportions of the pyridine and sodium used in the process of the present invention are usually between 4 and 10, preferably between 4 and 6 molecular proportions of the pyridine for each atomic proportion of sodium. Larger proportions of the pyridine may be used but this tends to make the process uneconomic. Smaller proportions tend to make the reaction mixture inconveniently thick.

The mechanism of the reactions involved in our process is obscure. The mechanism of the oxidation is especially obscure, so we use the term "oxidation" in the sense of including any process which effects removal of hydrogen or electrons from the sodium-pyridine interaction product. The oxidation of the sodium-pyridine interaction product may be carried out in known manner, for example by means of oxygen, or mixtures thereof with an inert diluent gas, for example nitrogen. This can be conveniently carried out by bubbling the oxygen, for example in the form of air or some other mixture of oxygen and nitrogen, through the reaction mixture while it is stirred vigorously by means of a mechanical stirrer to promote thorough gas/liquid contact. We have found that the oxidation may also be carried out using chlorine, alone or in admixture with an inert diluent gas.

During the oxidation step, sodium hydroxide is produced in a colloidal and unfilterable form. We have found that this problem may be overcome by heating the reaction mixture after the oxidation in the presence of water; this precipitates sodium hydroxide in a filterable form. The water may be added before or after the oxidation is completed, and the proportion of water to be used can be established by simple trial. Trimethyl benzene or other hydrocarbons may be added as a diluent if desired. When the oxidation is carried out with chlorine, sodium chloride is produced. The separation of the sodium chloride may also be facilitated by the addition of water in the same way as the separation of sodium hydroxide, described above.

The 4:4'-isomer may be isolated in a pure state from the product resulting from the oxidation step. For this purpose, separation from isomeric bipyridyls may be achieved in known manner, for example by fractional distillation or crystallisation of the bipyridyls or their hydrochlorides. For some purposes, however, it is sufficient to isolate a product containing relatively small amounts of the 2:2'- and 2:4'-isomers. This mixed isomer product may conveniently be used for the manufacture of herbicides, for example by treatment with quaternising agents (e.g. methyl chloride or dimethyl sulphate).

The invention is illustrated but not limited by the following examples in which the parts and percentages are by weight.

EXAMPLE 1

A dispersion of sodium metal in trimethyl benzene was made by heating the required amount of sodium and trimethyl benzene to 120–130° C. until the sodium was molten, and stirring vigorously at this temperature under nitrogen for one hour. The dispersion was then allowed to cool, without stirring, and was poured from the dispersion vessel when cold. With suitable stirring a particle size equivalent to 0.15 metre$^2$/gm. may be obtained.

The sodium dispersion was added to stirred pyridine in a reaction vessel at such a rate that the heat of reaction maintained the temperature of the mixture at 90–95° C. The reaction up to the oxidation step was carried out under nitrogen. The contents of the vessel were maintained at 90° C. for two hours, with stirring, and were then cooled to 70° C. and oxidised by passing in a stream of air while stirring vigorously and cooling to remove the heat of reaction. Towards the end of the reaction it was necessary to apply heat to hold the temperature steady. At the end of the oxidation, as marked by the disappearance of black sodium/pyridine reaction mixture, there was added to the reaction mixture about 5% of its weight of water, followed by 50% of its weight of trimethyl benzene. The contents of the flask were heated to 95° C. for about 15 minutes and then were allowed to cool. In this way the caustic soda present was converted to an easily filtered suspension, which was filtered off and washed with further amounts of trimethyl benzene. The filtrate was distilled at atmospheric pressure to remove pyridine, and was then fractionated at 15 mm. pressure to remove trimethyl benzene, and finally bipyridyl was distilled at the same pressure. The product was obtained as a colourless oil which rapidly crystallised as a white solid containing bipyridyls, of which 80–90% is the 4:4'-isomer.

Table I shows the results obtained in 28 experiments using different reaction conditions. The process used for each of these experiments was that described above, using approximately 4 molecular proportions of pyridine for each atomic proportion of sodium, and using a sodium dispersion containing approximately 29% by weight of sodium metal.

*Table I*

| Expt. No. | Reaction | | Oxidation | | Analysis of product, percent W./W. | | | | | Ratio of bipyridyl isomers | | | Percent yield 4:4'-bipyridyl | |
|---|---|---|---|---|---|---|---|---|---|---|---|---|---|---|
| | Time, hrs. | Temp., °C. | Temp., °C. | Rate, l./hr. | 2:2'-bipyridyl | 2:4'-bipyridyl | 4:4'-bipyridyl | Pyridine | Sodium* | 2:2'- | 2:4'- | 4:4'- | On sodium | On pyridine |
| 1 | 2 | 115 | 60 | 20 | 1.2 | 5.4 | 9.0 | 47 | 5.4 | 0.22 | 1 | 1.7 | 49 | 29 |
| 2 | 4 | 115 | 80 | 20 | 1.2 | 4.4 | 8.7 | 48 | 4.5 | 0.27 | 1 | 2.0 | 57 | 29 |
| 3 | 2 | 100 | 80 | 20 | 0.2 | 2.9 | 8.3 | 56 | 5.4 | 0.07 | 1 | 2.9 | 46 | 37 |
| 4 | 2 | 100 | 60 | 10 | 0.2 | 1.9 | 8.2 | 62 | 5.3 | 0.11 | 1 | 4.3 | 46 | 49 |
| 5 | 4 | 115 | 60 | 10 | 1.1 | 5.8 | 10.2 | 46 | 5.2 | 0.19 | 1 | 1.8 | 38 | 31 |
| 6 | 2 | 115 | 80 | 10 | 1.0 | 4.3 | 9.1 | 46 | 5.1 | 0.23 | 1 | 2.1 | 53 | 28 |
| 7 | 4 | 100 | 80 | 10 | 0.2 | 2.8 | 8.2 | 58 | 5.3 | 0.07 | 1 | 2.9 | 46 | 39 |
| 8 | 4 | 100 | 60 | 20 | 0.3 | 3.2 | 9.4 | 57 | 5.2 | 0.09 | 1 | 2.9 | 54 | 44 |
| 9 | 3 | 107.5 | 70 | 15 | 0.4 | 3.7 | 8.3 | 56 | 5.0 | 0.11 | 1 | 2.2 | 49 | 36 |
| 10 | 2 | 115 | 60 | 10 | 1.1 | 5.2 | 9.4 | 53 | 5.1 | 0.21 | 1 | 1.8 | 54 | 37 |
| 11 | 3 | 87.5 | 59 | 12 | nd | 0.8 | 7.8 | 59 | 4.7 | ------- | 1 | 9.8 | 49 | 39 |
| 12 | 3 | 77.5 | 53.5 | 11 | nd | 0.5 | 7.0 | 62 | 5.4 | ------- | 1 | 14.0 | 38 | 41 |
| 13 | 3 | 67.5 | 48 | 9 | nd | 0.3 | 5.0 | 62 | 5.0 | ------- | 1 | 17.0 | 30 | 30 |
| 14 | 3 | 57.5 | 42.5 | 8 | nd | 0.4 | 4.5 | 69 | 5.3 | ------- | 1 | 11.3 | 25 | 45 |
| 15 | 4.5 | 112.5 | 65.5 | 16 | 1.0 | 4.0 | 9.0 | 44 | 5.7 | 0.25 | 1 | 2.3 | 46 | 28 |
| 16 | 5.25 | 115 | 63 | 16 | nd | 5.7 | 9.4 | 43 | 5.2 | ------- | 1 | 1.7 | 53 | 26 |
| 17 | 6 | 117.5 | 61 | 17 | 1.3 | 4.6 | 8.2 | 46 | 5.5 | 0.28 | 1 | 1.8 | 44 | 26 |
| 18 | 1 | 95 | 50 | 10 | nd | 1.6 | 7.5 | 59 | 5.6 | ------- | 1 | 4.7 | 49 | 39 |
| 19 | 1 | 105 | 50 | 5 | nd | 2.5 | 7.2 | 60 | 5.1 | ------- | 1 | 2.9 | 42 | 44 |
| 20 | 0.25 | 115 | 50 | 10 | nd | 2.4 | 5.9 | 60 | 5.2 | ------- | 1 | 2.5 | 33 | 31 |
| 21 | 1 | 90 | 45 | 5 | nd | 0.6 | 6.0 | 63 | 5.1 | ------- | 1 | 10.0 | 35 | 40 |
| 22 | 6 | Reflux | 60 | 20 | nd | 5.1 | 9.4 | 42 | 5.3 | ------- | 1 | 1.8 | 51 | 26 |
| 23 | 1 | 70 | 45 | 20 | nd | 0.8 | 5.4 | 65 | 5.5 | ------- | 1 | 6.8 | 29 | 37 |
| 24 | 3 | 50 | 70 | 20 | nd | 1.6 | 3.6 | 65 | 6.7 | ------- | 1 | 2.2 | 17 | 27 |
| 25 | 4 | 60 | 60 | 30 | nd | 1.0 | 2.6 | 66 | 5.8 | ------- | 1 | 2.6 | 13 | 19 |
| 26 | 1.0 | Reflux | 80 | 10 | 2.7 | 6.2 | 10.5 | 46 | 4.6 | 0.23 | 1 | 1.7 | 67 | 31 |
| 27 | 3.5 | Reflux | 45 | 30 | 2.3 | 6.3 | 11.4 | 41 | 5.8 | 0.27 | 1 | 1.8 | 57 | 30 |
| 28 | 5.0 | Reflux | 50 | 20 | 1.5 | 4.7 | 10.3 | 46 | 4.9 | 0.31 | 1 | 2.2 | 62 | 30 | nd = not determined, i.e. amount present below the experimental error of the analytical method used.
*Analysis given as sodium but present in reaction product as sodium hydroxide.

In contrast, when the interaction of the sodium and pyridine was carried out at 28°–32° C., reaction was very much slower and the final yield of bipyridyls much lower. The efficiency on pyridine was 11.9%, the efficiency on sodium 5.7%, and the bipyridyl mixture contained only 79.3% of the 4:4'-isomer.

EXAMPLE 2

The following example illustrates the oxidation step of our process using chlorine.

A batch of sodium/pyridine reaction product made according to the method described above with a reaction temperature of 115° C. was cooled to 60° C. and was treated with an amount of chlorine equivalent to the sodium present, by passing in the gas with vigorous stirring and cooling to hold the temperature at the required level. At the end of the reaction the black intermediate had disappeared and the contents of the flask were a brown gelatinous mass. Trimethyl benzene equivalent to 25% by weight of the flask contents was added and the product was heated to 130° C. with stirring for half an hour. It was allowed to cool then was filtered from sodium chloride, the residual filter cake being washed with trimethyl benzene.

The filtrate was analysed for bipyridyls, the total yield of bipyridyl on the pyridine consumed being 84%, the 4:4'-bipyridyl yield being 49.5%.

EXAMPLE 3

The procedure of Example 1 was repeated except that there were used 4 molecular proportions of 2-methyl pyridine (i.e. 372 parts) and one atomic proportion of sodium (i.e. 23 parts) in the form of the dispersion described, and that these were heated together at 125° C. A similar colour to the blue-black colour of the sodium-pyridine interaction product developed, and reaction proceeded in a very similar way to that which occurred in the case of sodium and pyridine. The reaction product, after removal of excess 2-methyl pyridine, gave 50% yield of 2:2'-dimethyl-4:4'-bipyridyl as cream coloured crystals, melting at 81–83° C. This product gave a blue colour with zinc dust and acetic acid, but gave no colour with ferrous sulphate.

EXAMPLE 4

The procedure of Example 1 was repeated except that there were used 4 molecular proportions (i.e. 428 parts) of 2:6-dimethyl pyridine and one atomic proportion of sodium (i.e. 23 parts) in the form of the dispersion described, and that these were heated together at 140° C. Distillation of the product gave 2:2':6:6'-tetramethyl-4:4'-bipyridyl as a fraction boiling at 147° C. (2 mm. mercury pressure) and melting at 150–152° C. This gave no colour with ferrous sulphate.

What we claim is:

1. In a process for the manufacture of bipyridyls by reacting a pyridine compound selected from the group consisting of pyridine and alkyl-pyridines which are free from alkyl substitution in the 4-position with sodium followed by oxidizing the sodium-pyridine interaction product so formed, the improvement which comprises reacting said pyridine compound and sodium at a temperature in the range of 50° C. to 120° C. using between 4 to 6 molecular proportions of pyridine compound for each atomic proportion of sodium.

2. A process for preparing bypyridyls which comprises reacting pyridine with sodium dispersed in a hydrocarbon diluent at a temperature in the range of 50° C. to 120° C. using 4–6 molecular proportions of pyridine for each atomic proportion of sodium, thereafter oxidizing the resulting sodium-pyridine reaction product, heating the reaction mixture after said oxidation in the presence of sufficient water to precipitate sodium hydroxide in filterable form and removing the thus precipitated hydroxide.

3. The process of claim 2 wherein said diluent is trimethyl benzene.

4. In a process for the manufacture of bipyridyls by reacting a pyridine compound selected from the group consisting of pyridine and alkyl-pyridines which are free from alkyl substitution in the 4-position, with sodium followed by oxidation of the resulting sodium-pyridine reaction product, the improvement which comprises adding water to the reaction mixture after said oxidation, heating the resulting mixture to precipitate sodium hydroxide in a filterable form and then filtering off said hydroxide.

5. Process as claimed in claim 1 wherein the pyridine compound is treated with sodium at a temperature in the range 75° C. to 100° C.

6. Process as claimed in claim 1 wherein the pyridine compound is pyridine itself.

7. Process as claimed in claim 1 wherein the sodium is in dispersed form.

8. Process as claimed in claim 1 wherein the oxidation is carried out by means of oxygen.

9. Process as claimed in claim 1 wherein the oxidation is carried out by means of chlorine.

10. Process as claimed in claim 1 wherein the reaction mixture after the oxidation is heated in the presence of a proportion of water sufficient to precipitate the sodium hydroxide in filterable form.

11. Process as claimed in claim 1 wherein the pyridine compound is 2-methylpyridine.

12. Process as claimed in claim 1 wherein the pyridine compound is 2:6-dimethylpyridine.

References Cited by the Examiner

UNITED STATES PATENTS 2,773,066   12/1956   Linnel et al. _____ 260—296.6

OTHER REFERENCES

Beilstein: "Handbuch der Organische Chemie," Band 23 H.W., p. 240 (Springer) (1936).

Huth: "Berichte," vol. 31, pp. 2280–82 (1898).

Klingsberg: Pyridine and Its Deriv., Part 2, p. 277 (1961).

Smith: J. Am. Chem. Soc., vol. 46, pp. 414–419 (1924).

Zahlan et al.: J. Am. Chem. Soc., vol. 77, p. 6207 (1955).

WALTER A. MODANCE, *Primary Examiner.*

DUVAL T. McCUTCHEN, *Examiner.*